(12) United States Patent
Yoshida et al.

(10) Patent No.: US 6,605,227 B2
(45) Date of Patent: *Aug. 12, 2003

(54) METHOD OF MANUFACTURING A RIDGE-SHAPED THREE DIMENSIONAL WAVEGUIDE

(75) Inventors: Ayako Yoshida, Tsurugashima (JP); Atsushi Onoe, Tsurugashima (JP); Kiyofumi Chikuma, Tsurugashima (JP)

(73) Assignee: Pioneer Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/425,940

(22) Filed: Oct. 25, 1999

(65) Prior Publication Data

US 2002/0179567 A1 Dec. 5, 2002

(30) Foreign Application Priority Data

Oct. 26, 1998 (JP) .............................. 10-303652

(51) Int. Cl.⁷ .................. C30B 33/00; C30B 33/08; C30B 33/12; H01L 21/3065
(52) U.S. Cl. ..................... 216/23; 216/24; 438/706; 438/745; 117/918; 117/948
(58) Field of Search ..................... 216/24, 23; 117/918, 117/948; 438/706, 745

(56) References Cited

U.S. PATENT DOCUMENTS

| | | | | |
|---|---|---|---|---|
| 4,275,286 A | * | 6/1981 | Hackett, Jr. .............. | 219/121.2 |
| 4,946,240 A | * | 8/1990 | Yamamoto et al. ......... | 359/328 |
| 5,032,220 A | * | 7/1991 | Yamamoto et al. .......... | 216/24 |
| 5,347,608 A | * | 9/1994 | Nakamura et al. .......... | 385/130 |
| 5,371,812 A | * | 12/1994 | Nakamura ..................... | 385/9 |
| 5,581,396 A | * | 12/1996 | Kubota et al. .............. | 359/332 |
| 5,737,117 A | | 4/1998 | Imaeda et al. .............. | 359/332 |

FOREIGN PATENT DOCUMENTS

| | | |
|---|---|---|
| JP | B-5-11078 | 2/1993 |
| JP | A-8-6083 | 1/1996 |

\* cited by examiner

*Primary Examiner*—Benjamin L. Utech
*Assistant Examiner*—Lynette T. Umez-Eronini
(74) *Attorney, Agent, or Firm*—Morgan, Lewis & Bockius LLP

(57) ABSTRACT

A method of manufacturing a ridge-shaped 3-dimensional waveguide, has the steps of: forming a crystal film made of a second ferroelectric oxide non-linear crystal having a refractive index higher than that of a substrate made of a first ferroelectric oxide non-linear crystal on the substrate; forming a metal film on the crystal film; forming a mask by etching the metal film; and forming a ridge portion by selectively removing the crystal film through the mask by a dry etching method.

7 Claims, 1 Drawing Sheet

METHOD OF MANUFACTURING A RIDGE-SHAPED THREE DIMENSIONAL WAVEGUIDE

BACKGROUND OF THE INVENTION

1. Field of the Invention

The invention relates to a manufacturing method of a ridge-shaped three-dimensional waveguide and, more particularly, to a method of manufacturing a ridge-shaped 3-dimensional waveguide of a ferroelectric oxide non-linear crystal (hereinafter, also referred to as FONL) which can be used in a wavelength converting device.

2. Description of the Related Art

In a wavelength converting device e.g., a second harmonic generation (SHG) device, an FONL of a high optical constant is used to efficiently generate a second harmonic. The wavelength converting device needs to satisfy a phase matching condition by a fundamental wave and a second harmonic. Various phase matching methods have been tried such as using angle tuning, temperature tuning, and field tuning in a substrate crystal with birefringence used in the wavelength converting device. Also Cerenkov radiation, Quasi phase matching, and the like have been tried.

A bulk crystal of an FONL of a large non-linear optical constant such as $LiTaO_3$ (hereinafter, referred to as LT), $LiNbO_3$ (hereinafter, referred to as LN), $KTiOPO_4$ (hereinafter, referred to as KTP), or the like is used in a substrate of the wavelength converting device. For example, a bulk crystal of a crystal made of Li, Nb, Ta, and O (hereinafter, referred to as LNT) is formed for example by CZ (Czochralski) method in which a crystal rod grows while pulled up from a melting material liquid.

High quality bulk crystal is expensive and is not practical. A method of forming a monocrystal film of LNT on a sapphire substrate by a plasma vapor phase growing method or the like has been developed (JP-B-5-11078). According to this method, Li, Ta, and Nb are oxidized on the sapphire substrate in an oxygen plasma and the LNT monocrystal film is epitaxially grown and deposited.

A ferroelectric material having an increased high optical constant is demanded for the waveguide of the wavelength converting device. The wavelength converting device in which an FONL having compositions expressed by a formula of, for example, $K_3Li_{2-x}Nb_{5+x-y}Ta_yO_{15+2-x}$ ($-0.4 \leq x \leq 0.20$, $0 \leq y \leq 0.33$) of a crystal made of K, Li, Nb, Ta, and O (hereinafter, referred to as KLNT) or a crystal made of K, Li, Nb, and O (hereinafter, referred to as KLN) is formed as an epitaxial layer on a substrate by a metal-organic chemical vapor phase deposition or epitaxy (hereinafter, referred to as MOCVD) method or the like has also been developed (JP-A-8-6083).

In an SHG device using an FONL such as KLNT, KLN, KN, LNT, LN, or the like as the wavelength converting device, the following methods (1) to (3) of forming a 3-dimensional waveguide to strongly confine an injected fundamental light have been tried in order to raise the converting efficiency to convert a fundamental light wavelength into a blue light wavelength.

(1) For example, in a diffusion waveguide of Ti, by diffusing Ti into the crystal surface of an LN substrate, a refractive index of the diffusing portion is increased more than that of a substrate cladding, and a 3-dimensional waveguide is formed, or in a proton converting method, by immersing the LN crystal substrate in phosphoric acid, a conversion from $Li^+$ to proton ($H^+$) occurs, and a layer of a higher refractive index than that of the substrate cladding is obtained on the crystal surface, thereby obtaining a 3-dimensional waveguide.

(2) There is also a loading type 3-dimensional waveguide such that when a dielectric material is loaded onto a part of a two-dimensional waveguide which has previously been formed, an equivalent refractive index of the dielectric loading portion is higher than that of the substrate cladding, and the light can be confined in this portion.

(3) Further, a method of manufacturing a channel type waveguide by polishing, cutting or the like has also been tried.

The above methods of forming 3-dimensional waveguides of the oxide non-linear crystal type, however, have the following problems. According to the forming method of the waveguides of the diffusion type and the proton converting type (chemical working type) of (1), although a smooth waveguide having a low loss can be easily formed, there are problems such that the inherent characteristics of the crystal deteriorate, the non-linear constant to decide the efficiency of SHG decreases, light damage occurs, and the like. According to the method of forming the loading type waveguide of (2), although there is an advantage such that the forming method is easy and no damage is given to the crystal itself is not damaged, since the refractive index difference is small, light confinement ability is weak and a beam profile of the propagation light is distorted, so that converting efficiency deteriorates. Further, the polishing, cutting method of (3) has drawbacks such that the production rate is low, it is difficult to precisely form the waveguide in accordance with the initial design, and the like.

A method of easily forming a ridge-shaped 3-dimensional waveguide in which a channel of a projecting portion having a refractive index higher than that of a substrate cladding is formed has been tried, since the ridge-shaped 3-dimensional waveguide strongly confines an injected fundamental light therinto. A reactive ion etching (hereinafter, referred to as RIE) is used as one of the methods of forming the ridge-shaped 3-dimensional waveguide. RIE is a directed chemical process in which chemically active ions are accelerated along electric field lines to meet a substrate to be worked i.e., a physically and chemically etching process utilizing a physical sputter etching effect and a chemical etching effect.

With respect to the physical sputter etching effect, any material can be etched in the RIE principle. There are, however, problems such that the etching speed is low, the material to be worked is damaged, and the like. Since FONL is generally very rigid, it is difficult to select a material for a mask used in the RIE for processing the FONL such that a high selective etching ratio is given.

With respect to the chemical etching effect, an active ion gas to be used must cause a chemical reaction with a material to be worked. Not only does the ion gas react but also a product generated thereby must be removed. That is, it is necessary that the reactive product has a high vapor pressure.

OBJECT AND SUMMARY OF THE INVENTION

The present invention has been made in view of the above circumstances, and thus an object thereof is to provide a method of manufacturing a ridge-shaped 3-dimensional waveguide of an FONL which is difficult to be mechanically and chemically worked.

According to the invention, there is provided a method of manufacturing a ridge-shaped 3-dimensional waveguide, comprising the steps of:

preparing a substrate made of a first ferroelectric oxide non-linear crystal;

forming a crystal film made of a second ferroelectric oxide non-linear crystal having a refractive index higher than that of the first ferroelectric oxide non-linear crystal on said substrate;

forming a metal film on said crystal film;

forming a mask by etching said metal film; and forming a ridge portion by selectively removing said crystal film through said mask by a dry etching method.

In accordance with an aspect of the invention, the first ferroelectric oxide non-linear crystal for the substrate is a material selected from a crystal group consisting of a crystal made of K, Li, Nb, Ta, and O, and a crystal made of K, Li, Nb, Ta, and O and doped with at least one element selected from Ta, Rb, Na or at least one of rare earth elements.

In accordance with another aspect of the invention, the second ferroelectric oxide non-linear crystal for the crystal film is another material selected from a crystal group consisting of a crystal made of K, Li, Nb, Ta, and O, and a crystal made of K, Li, Nb, Ta, and O and doped with at least one element selected from Ta, Rb, Na or at least one of rare earth elements.

In accordance with a further aspect of the invention, said step of forming the crystal film provides the crystal film being fabricated through a metal-organic chemical vapor phase epitaxy method.

In accordance with another aspect of the invention, said crystal film is etched by the dry etching method using an etching gas of a mixture comprising $CF_4$ and $O_2$.

In accordance with a further aspect of the invention, said crystal film is etched by the dry etching method using a tray made of a material that is inactive for the etching gas.

In accordance with a still further aspect of the invention, said inactive material is selected from one of quartz, alumina, and sapphire.

In accordance with a still further aspect of the invention, the step of forming the mask includes a step of forming a resist pattern on the metal film by a photolithography method and a step of one of wet etching and dry etching the metal film according to the resist pattern, thereby forming a metal mask.

In accordance with another aspect of the invention, the metal film is aluminum.

In accordance with a further aspect of the invention, the metal film is chromium.

DETAILED DESCRIPTION OF THE PREFERRED EMBODIMENTS

An embodiment according to the present invention will be described in more detail with reference to the accompanying drawings.

The invention is directed to a dry etching of a substrate made of an FONL such as KLN or the like which can be performed by performing the following three processes. First, a gas mixture of $CF_4$ and $O_2$ is selected as an etching gas for a dry etching and is used at a mixture ratio, such that a fluoride and an oxide are produced from a ferroelectric oxide and evaporated, and a non-linear crystal film is etched. Second, a chemical etching is suppressed by using a metal, as a mask, which is physically more rigid and is inactive for an etching gas as compared with an ordinary resist mask. As a result, a selective etching ratio is improved because the metal mask has a high durability against sputter etching. Third, by using a tray made of a material that is inactive for the etching gas, a reactive product produced by reacting with the tray does not obstruct the evaporation of the reactive product with a material to be worked.

(Manufacturing of a Two-Dimensional Waveguide)

Figure 1:
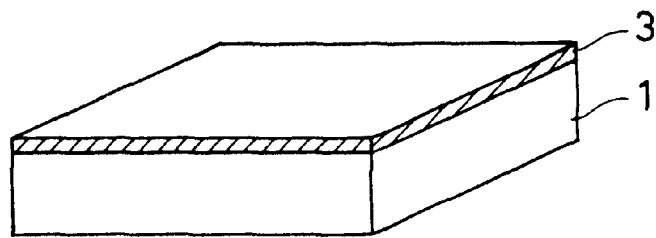
FIGS. 1 through 5 are schematic perspective views each showing a substrate in a method of manufacturing a ridge-shaped 3-dimensional waveguide of an embodiment according to the invention.

For example, as shown in FIG. 1, a crystal film 3 of KLN of FONL having a refractive index higher than that of a KLNT substrate 1 of FONL is epitaxially grown to a desired film thickness on the substrate 1 by using an MOCVD method, thereby forming a 2-dimensional waveguide.

A crystal substrate such as KLNT ($K_3L_{2-x}Nb_{5+x-y}Ta_yO_{15+2x}$) or the like is used as a substrate, thereby forming a film on the +c face or −c face thereof. A film which has previously been formed on the substrate by using, for example, $K_3Li_2Nb_5O_{15}$ or the like can be also used as a buffer layer. A crystal substrate of KLN in which at least one of Ta, Rb, and Na or at least one of rare earth elements such as Cr, Er, and Nd, or the like have been doped, is also used as a substrate.

Potassium dipivaloylmethanate $[K(C_{11}H_{19}O_2)]$ (hereinafter, referred to as K(DPM)), lithium dipivaloyl-methanate $[Li(C_{11}H_{19}O_2)]$ (hereinafter, referred to as Li(DPM)), and pentaethoxy niobium $Nb(OC_2H_5)_5$ are provided as starting raw materials by using an MOCVD apparatus. The gases of the starting raw materials are introduced into a reaction chamber in which a heating substrate is arranged by using an Ar carrier gas while controlling a flow rate and the raw material gases are allowed to flow onto the substrate, thereby epitaxially growing a KLN film having a refractive index higher than that of the substrate and forming a slab waveguide 3. In case of forming a cladding layer of a low refractive index on the substrate, pentaethoxy tantalum $Ta(OC_2H_5)_5$ is previously added to the starting raw material gases and a film is preliminarily formed. The crystal thin film having compositions expressed by formulae of $K_3Li_{2-x}Nb_{5+x-y}Ta_yO_{15+2x}$ can be formed by changing an atom ratio of a component of the epitaxial layer on the substrate.

More specifically, K(DPM), Li(DPM), $Nb(OC_2H_5)_5$, and $Ta(OC_2H_5)_5$ are individually sealed as starting raw materials into vaporizers respectively. The raw materials are sublimated in individual constant temperature air baths under a decompression environment of 160 Torr while keeping their temperature to a value within ±1° C. for given temperatures and then the obtained gases are supplied to a lateral reacting apparatus with flow channels by using the flow controlled Ar carrier gas respectively. Since the production of each oxide from the starting raw materials is accompanied with the oxidizing reaction, a predetermined amount of oxygen is added into the reaction gas. A quartz tray is put in the reacting apparatus and the substrate is arranged on the tray and heated at about 500 to 900° C. by high frequency heating.

The set temperatures of the constant temperature air bath are properly selected from temperature ranges of 180 to 200° C. in case of K(DPC), 180 to 210° C. in case of Li(DPM), 100 to 120° C. in case of $Nb(OC_2H_5)_5$, and 100 to 120° C. in case of $Ta(OC_2H_5)_5$, respectively.

It is preferable to set a film thickness of the epitaxial waveguide layer 3 of the KLN film to 2 to 4 μm and it is determined from wavelengths of a fundamental wave and a second harmonic and the refractive index of the substrate or cladding layer so that the waveguide light of the fundamental wave is propagated in a fundamental mode. In case of forming an epitaxial cladding layer, it is necessary to set a film thickness of the cladding layer so as to assure at least 2 μm or more so that evanescence of the waveguide light does not leak onto the substrate 1.

(Forming of Metal Film)

Figure 2:
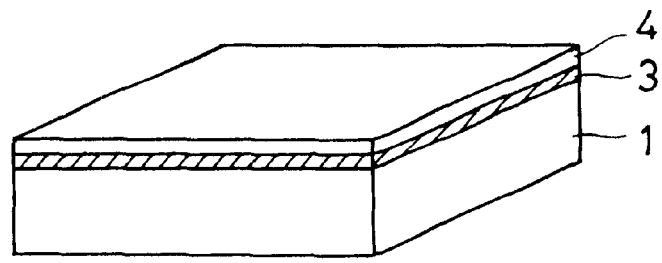

As shown in FIG. 2, a metal film 4 is formed on the epitaxial waveguide layer 3 of the KLN film by an evaporation deposition or sputtering method. The metal film 4 is a metal which is difficult to react with a $CF_4$ gas and an oxygen gas to etch KLN and, for example, Cr, Al, or the like can be used.

(Forming of Metal Mask)

Figure 3:
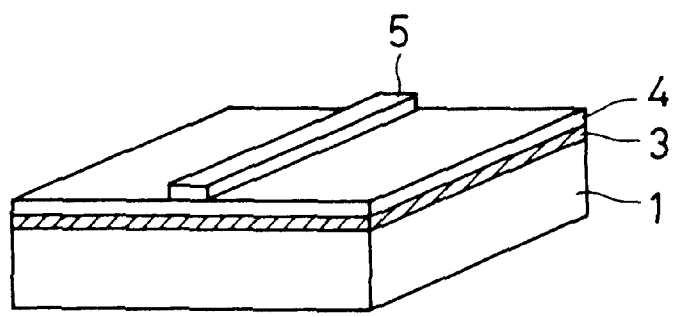
Figure 4:
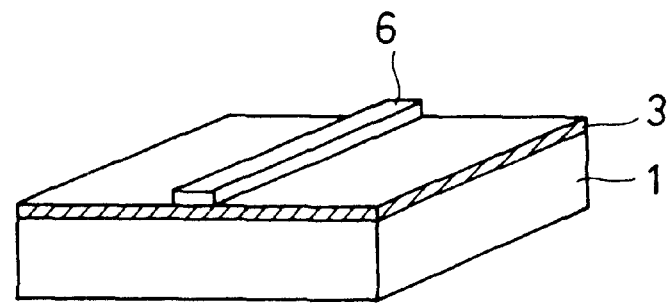

As shown in FIG. 3, a resist pattern 5 is subsequently formed on the metal film 4 by ordinary photolithography and the metal film 4 is etched by wet etching or dry etching by using the resist pattern as a mask. After that, the resist is removed, thereby forming a metal mask 6 as shown in FIG. 4. It is desirable to form the mask by dry etching when using the Al film mask and to form the mask by wet etching when using the Cr film mask.

(Dry Etching)

Figure 5:
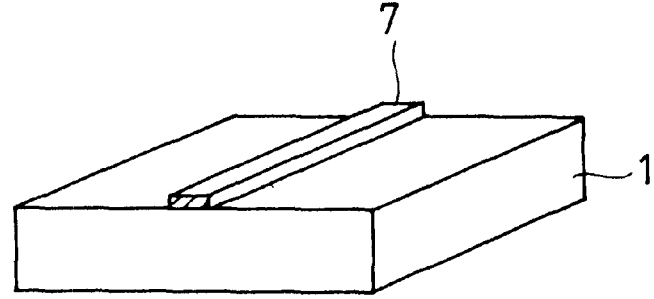

Subsequently, the KLN film 3 is etched by dry etching using the metal film as a mask 6 and using the RIE apparatus, thereby forming a ridge-shaped waveguide 7 as shown in FIG. 5. As for the dry etching, besides RIE process, a sputtering etching method, an inductively coupled plasma (ICP) etching method using a high Radio Frequency, or the like can be used. The ICP etching is fundamentally similar to RIE and is a method of etching by a high density plasma under a high vacuum environment. High anisotropic etching is accomplished and a high etching rate is obtained.

Hitherto, it was difficult to form a waveguide having a width of a few μm and a height of 2 to 3 μm through a conventional method by using a resist mask, since a selective etching ratio with the resist could not be obtained. However, a high selective etching ratio with the mask was obtained according to the embodiment of the invention characterized in the following features: by using (1) gases in which $CF_4$ and $O_2$ are mixed into the etching gas are used, (2) a material such as quartz, alumina, sapphire, or the like which is inactive for the etching gas is used as a material of the etching tray, thereby enabling a high etching rate to be obtained, and (3) a metal mask is used in place of a resist mask.

According to the invention, an SHG device having a high converting efficiency is manufactured since its ridge-shaped 3-dimensional waveguide with a low light loss was easily realized by dry etching of the KLN film through RIE or ICP using the metal mask.

What is claimed is:

1. A method of manufacturing a ridge-shaped 3-dimensional waveguide, comprising the steps of:

preparing a substrate made of a first ferroelectric oxide non-linear crystal of $K_3Li_{2-x}Nb_{5+x-y}Ta_yO_{15-2x}$ (−0.4≦x≦0.20, 0≦y≦0.33);

forming a crystal film made of a second ferroelectric oxide non-linear crystal of $K_3Li_{2-x}Nb_{5+x-y}Ta_yO_{15+2x}$ (−0.4≦x≦0.20, 0≦y≦0.33) having a refractive index higher than that of the first ferroelectric oxide non-linear crystal on said substrate through a metal-organic chemical vapor phase deposition process which includes the steps of: providing organic gases of starting raw materials containing K, Li, Nb and Ta respectively; and introducing individually the organic gases together with an oxygen gas onto the substrate placed in a reaction chamber of a metal-organic chemical vapor phase deposition apparatus, thereby epitaxially growing the crystal film;

forming a metal film on said crystal film;

forming a mask by etching said metal film; and forming a ridge portion by selectively removing said crystal film through said mask by a dry etching method, wherein said crystal film is etched by the dry etching method using an etching gas of a mixture comprising $CF_4$ and $O_2$.

2. A method according to claim 1, wherein the first ferroelectric oxide non-linear crystal for the substrate is doped with at least any one of Ta, Rb, Na and rare earth elements.

3. A method according to claim 1, wherein the second ferroelectric oxide non-linear crystal for the crystal film is a crystal made of K, Li, Nb, Ta and O, or a crystal made of K, Li, Nb, Ta and O and doped with at least any one of Ta, Rb, Na and rare earth elements.

4. A method according to claim 1, wherein said crystal film is etched by the dry etching method using a tray made of quartz, alumina or sapphire on which the substrate is arranged.

5. A method according to claim 1, wherein the step of forming the mask includes a step of forming a resist pattern on the metal film by a photolithography method and a step of one of wet etching and dry etching the metal film according to the resist pattern, thereby forming a metal mask.

6. A method according to claim 1, wherein the metal film is aluminum.

7. A method according to claim 1, wherein the metal film is chromium.

* * * * *